Patented May 26, 1931

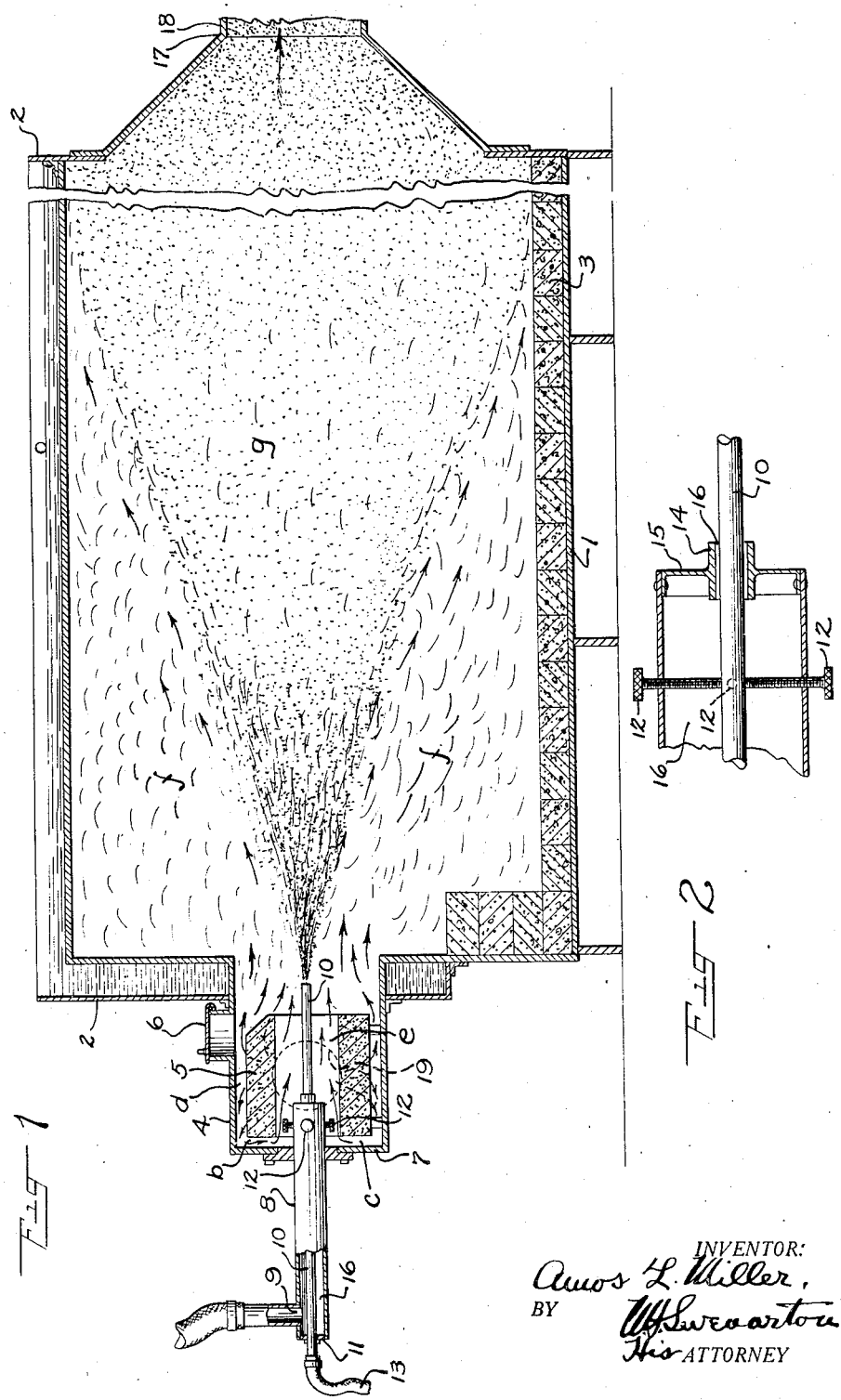

1,807,321

UNITED STATES PATENT OFFICE

AMOS L. MILLER, OF PHILADELPHIA, PENNSYLVANIA, ASSIGNOR TO THE AULT & WIBORG CO., OF CINCINNATI, OHIO, A CORPORATION OF OHIO

PROCESS AND APPARATUS FOR THE PRODUCTION FROM HYDROCARBON OIL OF BLACK PIGMENT CONSISTING OF CARBON

Application filed February 4, 1928. Serial No. 251,808.

This invention relates to the decomposition of hydrocarbons in order to obtain finely divided carbon and also the utilization of finely divided carbon in the production of printing inks, oil paints and the like.

This application is, as to common subject matter therein disclosed, a continuation in part of my copending applications Ser. No. 600,248 filed Nov. 11th, 1922, for process and apparatus for producing carbon black; Ser. No. 26,913 filed August 30th, 1925 for method and apparatus for dealing with particles in gaseous suspension; Ser. No. 26,914 filed April 30, 1925 for manufacture of lamp black and ink; Ser. No. 719,506 filed June 12, 1924 for manufacture of lamp black and Ser. No. 171,523 filed February 28, 1927 for method of and apparatus for making ink and as to the new subject matter, is an improvement thereover, more especially as to the invention disclosed in the last mentioned application No. 171,523.

Heretofore in the production of lamp black to which the production of my invention more especially relates and is peculiarly applicable, it has been customary to obtain a yield of 1 lb. or at the most about 2 lbs. of lamp black per gal. of oil consumed and in those cases where an especially high grade or quality of lamp black was obtained the yield was even less than such amount and the expenses of the production of high quality lamp black were considerably more than that involved in the production of ordinary lamp black as commonly marketed. Furthermore, on account of the quality of lamp black hertofore marketed, it has been considered impractical to employ the same in the manufacture of printing ink as a substitute for gas carbon, commonly termed carbon black, which latter is the product produced by the partial decomposition of natural gas and has always been regarded as being of far superior quality and tinctorial covering strength to lamp black.

My investigations have led to the discovery that not only can a much higher yield of black pigment consisting of finely divided carbon, such for example as lamp black, be obtained from the partial combustion of hydrocarbon oil, but that the quality or tinctorial covering strength of said black can be very decidedly improved without materially sacrificing the yield of such black.

Further objects of the invention are the provisioin of a simple, highly efficient and durable apparatus for the production of such black and which apparatus is easily controlled and relatively inexpensive to construct.

In the accompanying drawings in which I have illustrated a preferred form suitable for carrying out my invention:

Figure 1 is a vertical longitudinal section of a furnace in which my improved lamp black may be produced; and Fig. 2 is a fragmentary, enlarged detail of the burner tip.

Referring to the drawings and the construction shown therein, the reference numeral 1 designates the shell of a furnace, the same being equipped with a water jacket 2, which is adapted to cool the unlined portions of the shell, and having a refractory lining of firebrick 3 for protecting the hearth of such furnace and a portion of the front wall thereof from the intense heat of the productions of combustion.

At the front of the furnace I provide a cylindrical extension 4 of metal, preferably in which is positioned a pipe section 5 of suitable refractory material, the same being so disposed as to provide vertical air passages $b$ and $c$ and an annular air passage $d$, all in communication with a central or main duct $e$, as indicated.

A manhole 6 affords access to the burner of the furnace for the introduction of oil-soaked waste or other combustibles used for igniting purposes. The said extension 4 has an apertured rear wall 7 through which projects a supplemental tubular casing 8, that constitutes the burner, and said casing 8 is provided at its outer end with an air port 9 adapted to communicate with a source of preheated high pressure air.

An oil feed pipe or duct 10 projects centrally through said casing, the same being accurately centered therein by means of a bushing 11 and adjustable centering screws 12. The flexible connection 13 serves to connect said oil feed pipe to a source of hydrocarbon oil supply, such for example as creosote oil. Said casing 8 preferably projects but a short distance into the duct e and said oil feed pipe projects a substantial distance and at least 3 inches, but preferably from 6 to 10 inches beyond the extreme end of a nipple or sleeve 14, which latter is concentrically disposed in the outer end or cap 15 of said casing. As shown, said nipple or sleeve is of sufficiently greater cross sectional area than that of said oil feed pipe to afford an annular air passage 16 through which high pressure air is supplied to the furnace in such a manner as to completely envelope the projecting end of said oil feed pipe as well as the jet or stream of oil which is projected therefrom into the furnace. For a furnace of approximately 4.5 ft. in diameter, I preferably employ an oil feed pipe corresponding to a ⅛ inch iron pipe which is centrally supported in a one inch pipe and the nipple secured in the bushing 15 at the inner end of said casing preferably constitutes a ⅜ inch iron pipe about ½ inch long, beyond the outer end of which the oil feed pipe preferably projects not less than 3 inches nor more than 24 inches and preferably about 8 inches.

The rear end of the furnace is provided with an outlet aperture 17 which communicates through an air cooled pipe 18 of considerable length and an oil scrubber and an electrical precipitator with a stack, into which latter the exit gases are discharged after the removal of the carbon from the carbon-laden gases delivered by the furnace.

The method of producing lamp black in the above described apparatus is as follows:—

Hydrocarbon oil, as fuel oil from mineral oil or creosote oil from coal tar is supplied from a supply tank (not shown), is fed to the furnace through the pipe 13 and conduit 10, preferably at a rate of about 500 lbs. of oil per hour. The oil is ignited—the pressure on the oil being merely sufficient to overcome the resistance of the feed pipe—and high pressure air, for example, at 65 lbs. gauge pressure, is simultaneously conducted to the tubular casing 8 through the pipe 9 and is discharged into the furnace through the annular aperture 16, preferably at the rate of 45 to 50 cu. ft. per minute. The oil having been ignited and low pressure air, preferably preheated, at a pressure for example equivalent to 3 inches of water, is supplied through the conduit 19 at the rate of about 500 cubic feet per minute, when supplying oil at the aforesaid rate of 500 lbs. per hour.

The quality of lamp black produced in accordance with my invention as herein described, produces news inks which compare very favorably with those obtained by the employment of carbon black (i. e. natural gas black). Furthermore, in spite of the high quality of lamp black obtained by my improved method, I am able to produce a yield of approximately 4 lbs. of lamp black per gallon of hydrocarbon oil, such as coal tar, residual oil, for example. The theory or explanation of the improved results obtained is that the discharge of the high pressure air into the furnace a few inches in advance of the stream of oil, results in the greater portion of the air introduced in the furnace, especially by the high pressure air inlet, being expanded into a conical envelope or zone such as indicated by the reference letter $f$, without extensive commingling with the oil, which is delivered from the pipe 10 in the form of a jet, except superficially thereof. Said high pressure air furthermore effects the expansion or deflection of the low-pressure air so as to principally maintain the same in the gaseous zone of combustion $f$ which surrounds the conical zone of decomposition $g$ and consequently too intimate contact or admixture of the oil and air in the zone of decomposition is avoided and a minimum amount of the oil vapors is skimmed or deflected into the outer or combustion zone. In ordinary burners for the production of high quality lamp black, it is important that an unusually high percentage of total air to the amount of oil be maintained in order that there will not be an appreciable amount of free carbon formed in the outer or combustion zone and consequently a much lower yield is obtained than is possible by the process and apparatus herein described.

While I prefer to introduce the high pressure air into the furnace through an annular opening as 16, for example, the same may be delivered without departing from the spirit of my invention, through an annular series of orifices or otherwise so as to deliver the same in advance of the point of delivery of the oil.

The cross-section of the high pressure air duct in the casing 8 should be sufficient to prevent the pressure of the air delivered at the inner end of the casing dropping below about 30 lbs. per sq. inch and preferably is maintained well above 50 lbs. viz. about 65 lbs. per sq. inch as otherwise there is a tendency for the fuel oil delivered from the inner end of the feed pipe forming into drops which would fall to the hearth of the furnace and result in the gradual accumulation or accretion of coke thereon until the furnace would be so obstructed as to operate inefficiently or at times even entirely fail to function.

It is important that the air and oil supply be so regulated and the radiation surfaces so proportioned as to maintain the temperature in the furnace at not less than about 2000° F. preferably at about 2400° F. to 2600° F. as at lower temperatures undecomposed oil in substantial quantities will be present in the finished black. At lower temperatures say 1800° F. such as would be occasioned by having the radiation surfaces too extensive or as a result of supplying too little air to maintain the necessary temperature or from feeding a sufficient amount of oil to the furnace to exert a deleterious smothering effect, not only will under composed oil be present in the finished black, but the quality of black is materially impaired.

While I do not restrict my invention as herein claimed to the employment of preheated air, nevertheless, the preheating of the high pressure air tends to prevent the condensation of water in the air delivered to the furnace and thus eliminates the possibility of the formation of slugs of water which would tend to interfere with the proper operation of the burner. The preheating of the high pressure air and also the low pressure air also serves to augment the yield of black obtained.

The delivery into the furnaces of air from two sources namely high pressure air and low pressure air, is much to be preferred as the hottest part of the flame is on the circumference of the combustion zone *f* and the coolest is at the center of the decomposition zone *g*, consequently if insufficient low pressure, or what I term secondary air, is supplied considerable decomposition will occur in the combustion zone and considerable carbon will be set free therein, which will be of poor quality, or if all air necessary for combustion were supplied as low pressure air, the proper atomization of the oil could not be effected unless an expensive, high quality kerosene or like readily volatile oil were employed.

Various modifications within the scope of the appended claims may be made without departing from the spirit of my invention.

Having thus described my invention, what I claim and desire to obtain by United States Patent is:

1. A process of producing lamp black from hydrocarbon oil which comprises decomposing a portion of such material in an inner zone protected against substantial combustive exposure, such decomposition being effected by the heat in an outer zone of combustion of another portion of such material enveloping said inner zone, and continually supply additional hydrocarbon oil to be decomposed directly into the decomposition zone while supplying air for the partial combustion thereof solely to the outer or combustion zone.

2. A process of producing lamp black from hydrocarbon oil which comprises decomposing a portion of such material in an inner zone protected against combustive exposure, such decomposition being effected by the heat in an outer zone of combustion of another portion of such material enveloping said inner zone, continually feeding oil and air for effecting such decomposition and combustion, said oil being directly fed into the decomposition zone and said air being introduced into the combustion zone at a point substantially, and not less than three inches, in advance of the point of introduction of the oil into the decomposition zone.

3. An apparatus for producing lamp black, comprising an elongated casing having substantially an annular orifice at one end thereof and tubular means, for feeding oil to a flame, projecting centrally through said casing and concentrically disposed with respect to said annular opening, said oil feed means extending a substantial distance, and at least 3 inches, beyond the end of said casing, means for supplying air to the interior of said casing and means for supplying oil to said oil feed means.

4. In a furnace for producing black pigment consisting of finely divided carbon from hydrocarbon oil, comprising a furnace having a burner at one end thereof, said burner including an elongated casing projecting into said furnace, said casing having an air passage, tubular oil-feed conduit extending through said casing and beyond the same into the furnace, means for supplying high pressure air to said air passage and a terminal port for discharging of air into the furnace substantially, and at least 3 inches, in advance of the point to which the oil feed conduit extends into the furnace, means for delivering low pressure air into the furnace at a point in advance of the inner end of the oil feed conduit and baffling means for distributing said low pressure air in the form of an envelope around a stream of oil delivered into the furnace by said oil feed conduit.

5. In a furnace for producing black pigment consisting of finely divided carbon from hydrocarbon oil, comprising a furnace having a burner at one end thereof, said burner including an elongated casing projecting into said furnace, said casing having an air passage, a tubular oil-feed conduit extending through said casing and beyond the same into the furnace, means for supplying high pressure air to said air passage and a terminal port for discharging of air into the furnace substantially, and at least 6 inches, in advance of the point to which the oil feed conduit extends into the furnace, means for delivering low pressure air into the furnace at a point in advance of the inner end of the oil feed conduit and baffling means for distributing said low pressure air in the form of an envelope around a stream of oil delivered into the furnace by said oil feed conduit.

6. In a furnace for producing black pigment consisting of finely divided carbon from hydrocarbon oil, comprising a furnace having a burner at one end thereof, said burner including an elongated casing projecting into said furnace, said casing having an air passage, a tubular oil-feed conduit extending through said casing and beyond the same into the furnace, means for supplying high pressure air to said air passage and a terminal port for discharging of air into the furnace substantially, and at least about 8 inches, in advance of the point to which the oil feed conduit extends into the furnace, means for delivering low pressure air into the furnace at a point in advance of the inner end of the oil feed conduit and baffling means for distributing said low pressure air in the form of an envelope around a stream of oil delivered into the furnace by said oil feed conduit.

7. A process of producing lamp black from hydrocarbon oil, which comprises decomposing a portion of such material in an inner zone protected against combustive exposure, such decomposition being effected by the heat of an outer zone of combustion of another portion of such material enveloping said inner zone, continually feeding oil and air for effecting such decomposition and combustion, said air being introduced into the combustion zone at a point substantially, and not less than six inches, in advance of the point of introduction of the oil into the decomposition zone.

8. A process of producing lamp black from hydrocarbon oil, which comprises decomposing a portion of such material in an inner zone protected against combustive exposure, such decomposition being effected by the heat of an outer zone of combustion of another portion of such material enveloping said inner zone, continually feeding oil and air for effecting such decomposition and combustion, said air being introduced into the combustion zone at a point substantially, and not less than about eight inches, in advance of the point of introduction of the oil into the decomposition zone.

Signed at New York, in the county and State of New York this 3rd day of February, 1928.

AMOS L. MILLER.